(12) United States Patent
Duarte

(10) Patent No.: US 7,976,031 B2
(45) Date of Patent: Jul. 12, 2011

(54) CART ASSEMBLY

(75) Inventor: Marco A. Duarte, Lexington, SC (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 115 days.

(21) Appl. No.: 12/252,157

(22) Filed: Oct. 15, 2008

(65) Prior Publication Data
US 2009/0174160 A1    Jul. 9, 2009

Related U.S. Application Data

(60) Provisional application No. 60/980,349, filed on Oct. 16, 2007.

(51) Int. Cl.
*B62B 5/00* (2006.01)
(52) U.S. Cl. ............... 280/35; 280/47.35; 280/79.11
(58) Field of Classification Search ............... 280/638, 280/35, 47.34, 47.35, 79.11, 79.3, 79.6
See application file for complete search history.

(56) References Cited

U.S. PATENT DOCUMENTS

| | | |
|---|---|---|
| 3,523,392 A | 8/1970 | Carl |
| 4,476,754 A | 10/1984 | Ducret |
| 4,626,067 A | 12/1986 | Watson |
| 5,125,060 A | 6/1992 | Edmundson |
| 5,509,671 A | 4/1996 | Campbell |
| 5,528,718 A | 6/1996 | Ray et al. |
| 5,915,646 A | 6/1999 | Campbell |
| 6,270,094 B1 | 8/2001 | Campbell |
| 6,422,504 B1 | 7/2002 | Elder |
| 6,523,776 B1 * | 2/2003 | Elder ............... 242/594.4 |
| 7,006,739 B2 | 2/2006 | Elkins, II et al. |
| 7,016,592 B2 | 3/2006 | Elkins, II et al. |
| 7,068,906 B2 | 6/2006 | Bianchi et al. |
| 7,088,893 B2 | 8/2006 | Cooke et al. |
| 7,155,093 B2 | 12/2006 | Elkins, II et al. |
| 7,243,876 B2 * | 7/2007 | Robison ............ 242/557 |
| 7,317,863 B2 | 1/2008 | Lu et al. |
| 7,418,177 B2 | 8/2008 | Lu et al. |
| 7,532,799 B2 | 5/2009 | Gronvall et al. |
| 7,609,925 B2 | 10/2009 | Gronvall et al. |
| 7,658,345 B2 | 2/2010 | Wells et al. |
| 2009/0152746 A1 | 6/2009 | Wells et al. |

* cited by examiner

*Primary Examiner* — Jeffrey J Restifo
*Assistant Examiner* — Erez Gurari
(74) *Attorney, Agent, or Firm* — Merchant & Gould P.C.

(57) ABSTRACT

A cart assembly for use in adding a breakout to a fiber optic cable includes a frame having a first spool support, a second spool support and a central workstation. The central workstation is engaged with the first spool support and the second spool support such that the central workstation is disposed between the first and second spool supports. The central workstation is selectively releasably engaged with the first and second spool supports.

13 Claims, 9 Drawing Sheets

CART ASSEMBLY

CROSS REFERENCE TO RELATED APPLICATIONS

This application claims the benefit of U.S. Provisional Patent Application Ser. No. 60/980,349, filed Oct. 16, 2007, which is hereby incorporated by reference in its entirety.

TECHNICAL FIELD

The present disclosure relates to fiber optic cable systems and methods of manufacture, and more particularly, to methods for manufacturing fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates an exemplary passive optical network 100. As shown in FIG. 1, the network 100 may include a central office 110 that connects a number of end subscribers 115 (also called end users 115 herein). The central office 110 may additionally connect to a larger network such as the Internet (not shown) and a public switched telephone network (PSTN). The various lines of the network can be aerial or housed within underground conduits (e.g., see conduit 105).

In general, the network 100 includes feeder distribution cables (e.g., main cable 120) associated at one end with the central office 110. The portion of network 100 that is closest to central office 110 is generally referred to as the F1 region, where F1 refers to the "feeder fiber" from the central office. The F1 portion of the network may include a feeder cable (i.e., an F1 distribution cable) having on the order of 12 to 48 fibers; however, alternative implementations may include fewer or more fibers. The network 100 also has an F2 portion that includes cables and components located in closer proximity to the subscriber/end users 115.

The network 100 also may include fiber distribution hubs (FDHs) 130 that receive fibers of the main cable 120 extending from splice locations 125 and that output one or more F2 distribution cables 122. In general, an FDH 130 is an equipment enclosure that may include a plurality of optical splitters (e.g., 1-to-8 splitters, 1-to-16 splitters, or 1-to-32 splitters) for splitting the incoming feeder fibers into a number (e.g., 216, 432, etc.) of output distribution fibers corresponding to the F2 distribution cables 122. The F2 distribution cables are routed from the FDH 130 to locations in close proximity to the end users 115.

The network 100 typically includes a plurality of breakout locations 116 at which branch cables (e.g., drop cables, stub cables, etc.) are separated out from or optically coupled to distribution cables 122. Breakout locations 116 also can be referred to as tap locations or branch locations and branch cables also can be referred to as breakout cables or tethers. At a breakout location, fibers of the distribution cable can be broken out and connectorized to form a connectorized tether. In other embodiments, fibers of the distribution cable can be broken out and spliced to a length of optical fiber having a connectorized free end so as to form a connectorized tether.

Stub cables are typically branch cables that are routed from breakout locations 116 to intermediate access locations 104, such as a pedestals, drop terminals or hubs. Intermediate access locations 104 can provide connector interfaces located between breakout locations 116 and the subscriber locations 115. A drop cable is a cable that typically forms the last leg to a subscriber location 115. For example, drop cables can be routed from intermediate access locations 104 to subscriber locations 115. Drop cables also can be routed directly from breakout locations 116 to subscriber locations 115, thereby bypassing any intermediate access locations 104.

In certain embodiments, factory integrated terminations may be used at the F1 and/or the F2 region to provide environmentally sound and cost effective splicing protection. Factory integrated terminations refer to the use of factory integrated access (tap) points at specified locations, such as at breakout locations 116, in the network 100 instead of field installed splices. These breakout locations 116 may include connectorized tethers optically connected to the main cable at the factory. The manufacture of distribution cable having factory integrated termination is a time intensive process due to the large number of splices that are typically made, the significant testing that is typically performed for each splice, and the overall quantity of material handling and assembly that is typically required. It is desirable to provide manufacturing methods and manufacturing equipment that promote the efficient manufacture of distribution cable having factory installed branch lines.

SUMMARY

Certain aspects of the present disclosure relate to methods for efficiently manufacturing fiber optic distribution cable having factory installed branch lines. Certain other aspects of the present disclosure relate to equipment adapted facilitate the efficient manufacture fiber optic distribution cable having factory installed branch lines.

An aspect of the present disclosure relates to a cart assembly for use in adding a breakout to a fiber optic cable. The cart includes a frame having a first spool support, a second spool support and a central workstation. The central workstation is engaged with the first spool support and the second spool support such that the central workstation is disposed between the first and second spool supports. The central workstation is selectively releasably engaged with the first and second spool supports.

Another aspect of the present disclosure relates to a measuring and marking system for measuring and marking fiber optic distribution cable. The measuring and marking system includes a workstation disposed between a cable supply spool and a take-up spool. A spool drive is engaged with the take-up spool. A cable measuring device is positioned adjacent the workstation. A computer controller is in electrical communication with the cable measuring device and the spool drive.

Another aspect of the present disclosure relates to a method for adding a breakout to a fiber optic cable. The method includes loading a take-up spool and a cable supply spool having a cable coiled around the cable supply spool onto a measuring and marking system. A breakout location on the cable is marked. A desired length of the cable is measured and cut. The cable supply spool and the take-up spool are loaded onto a cart assembly for assembling a breakout at the breakout location. The cable is indexed to the breakout location. The breakout is assembled at the breakout location.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure relates generally to methods for manufacturing fiber optic distribution cables. In certain embodiments, the fiber optic distribution cables being manufactured include main cables and branch cables that branch from the main cables at factory installed breakout locations. A plurality of the breakout locations are provided at spaced-apart locations along the length of the main cable. Often the fiber optic distribution cables are custom made to satisfy customer specifications that define the exact locations the breakouts are to be provided along the length of the main cable.

Figure 1:
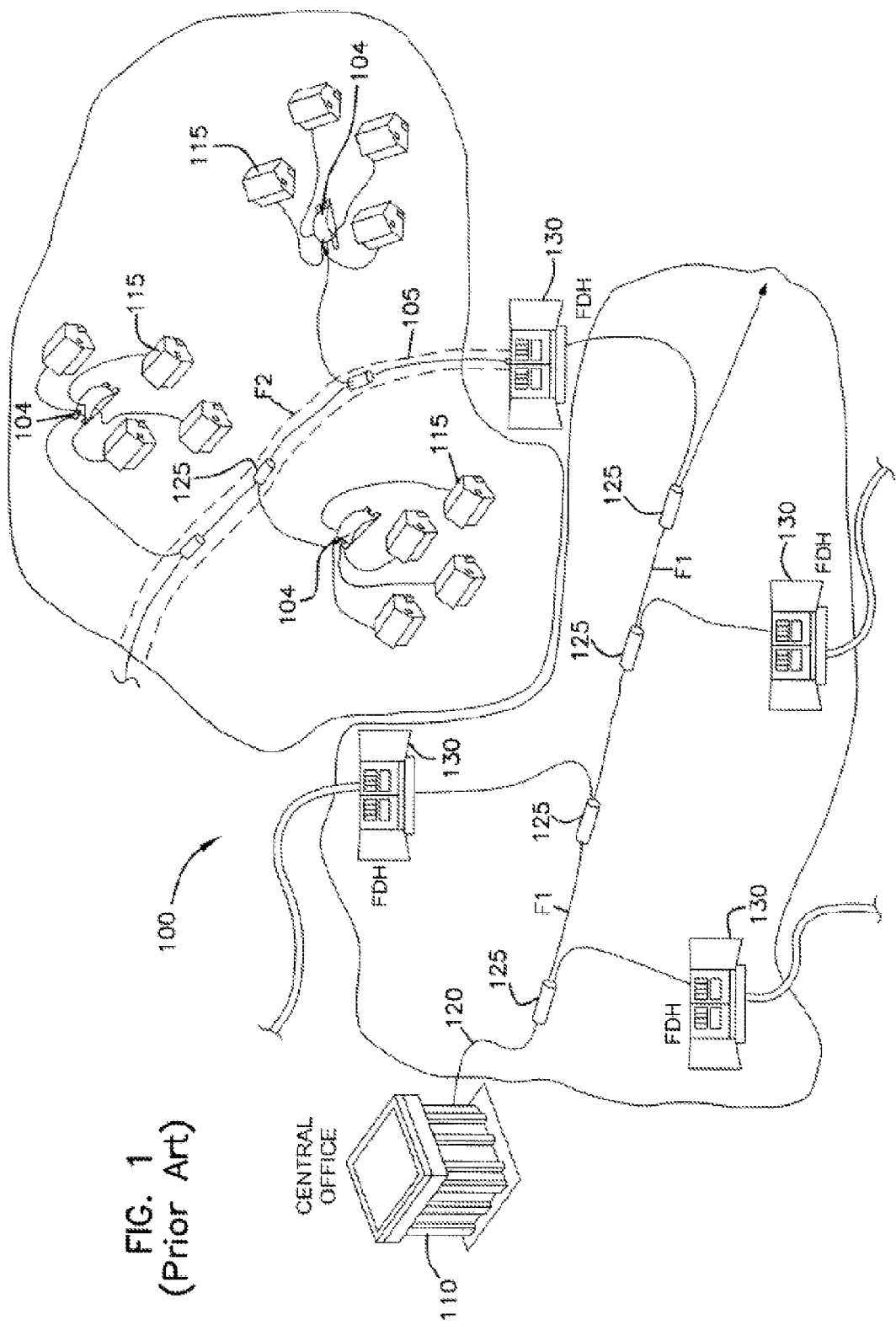
FIG. 1 is a schematic representation of a prior art passive optical network.
Figure 2:
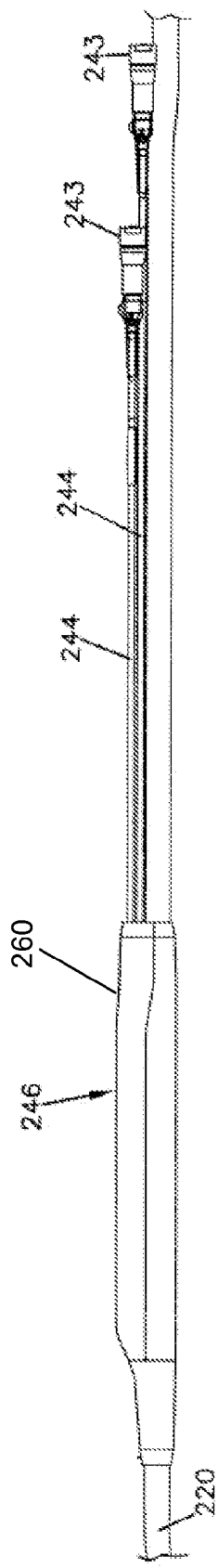
FIG. 2 is a left side view of a mid-span breakout location.
Figure 3:
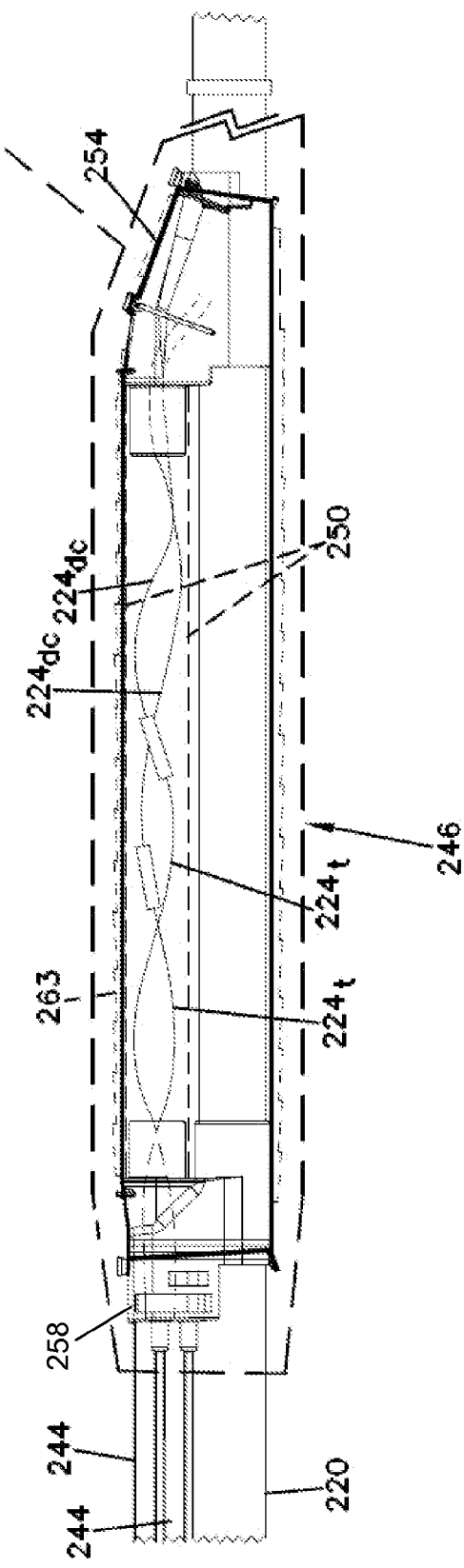
FIG. 3 is an enlarged right side view of the mid-span breakout location of FIG. 2 with an overmold, a wrap, and a tube removed but represented by dashed outlines.

Referring now to FIGS. 2 and 3, a section of a distribution cable that can be manufactured by methods in accordance with principles of the present disclosure is shown. The distribution cable includes a main cable 220 and tethers 244 that branch out from the main cable 220 at breakouts 246 positioned at locations spaced-apart along the length of the main cable 220. Each breakout 246 includes a breakout block 254, a retention block 258, and a tube 250 that extends from the breakout block 254 to the retention block 258. The tethers 244 are anchored to the retention block 258. Fibers $224_{dc}$ from the main cable 220 are accessed at the breakout 246, and routed through the break-out block 254 into the tube 250. Within the tube 250, the fibers $224_{dc}$ are spliced to fibers $224_t$ that are routed into the tethers 244. The tethers 244 are connectorized with multi-fiber connectors 243. An enclosure such as an overmolded body 260 covers and seals each breakout 246. A wrap 263 is positioned between the overmolded body 260 and the other components of the breakout 246 positioned within the overmolded body 260.

Figure 4:
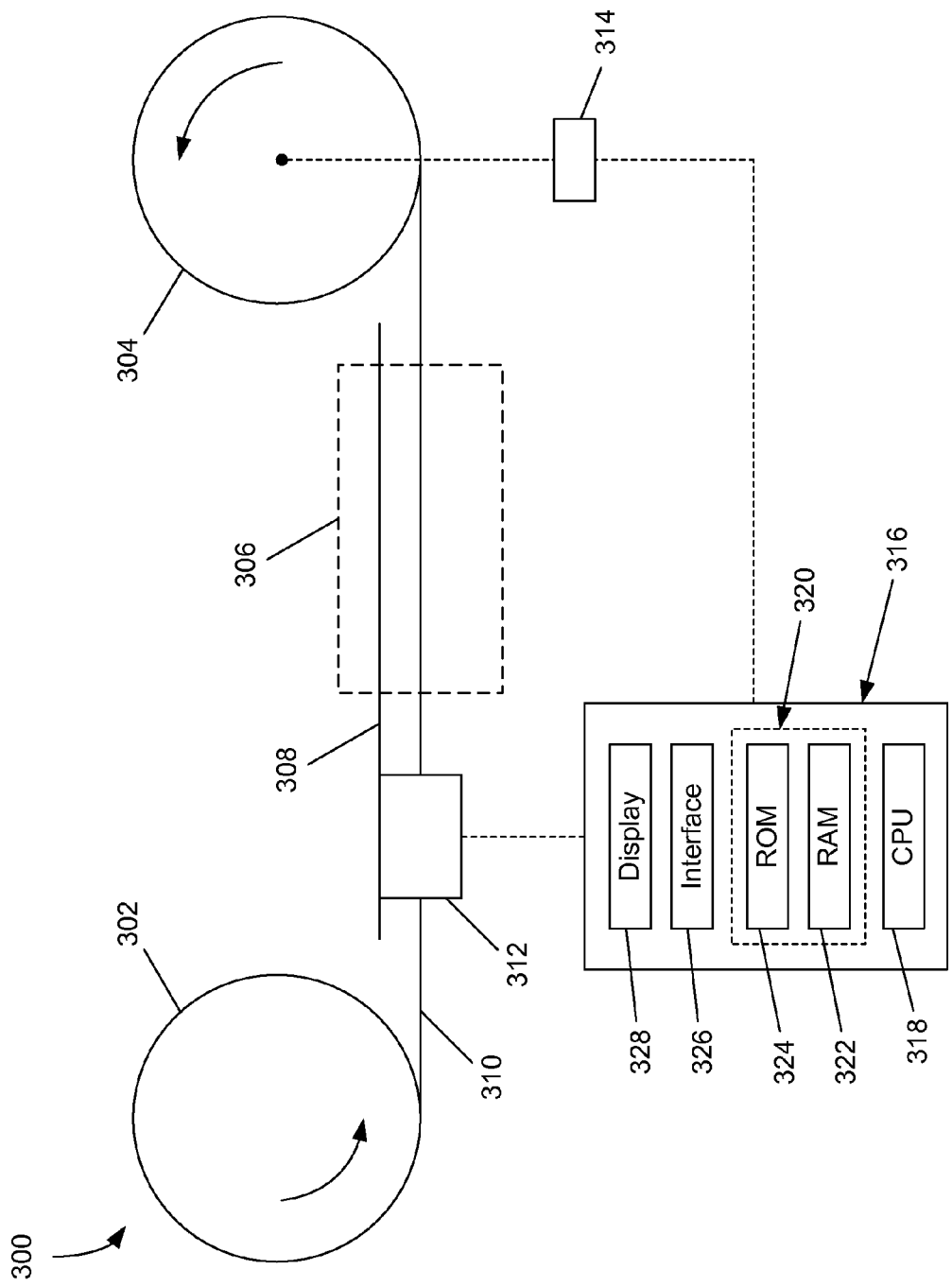
FIG. 4 is a schematic representation of an exemplary semi-automatic measuring and marking system having features that are examples of aspects in accordance with the principles of the present disclosure.

To accurately and efficiently manufacture distribution cable having breakouts 246 located at positions specified by the customer, a semiautomatic measuring system is preferably used. For example, FIG. 4 shows an example semiautomatic measuring and marking system 300 in accordance with the principles of the present disclosure.

The system 300 includes a cable supply spool 302 and a take-up spool 304. A workstation 306 is positioned between the spools 302, 304. The workstation 306 includes a guide 308 over which a cable 310 travels as it is carried from the supply spool 302 to the take-up spool 304. An automatic cable measuring device 312 is positioned adjacent the workstation 306. The cable measuring device 312 is configured to measure the length of the cable 310 that passes through the workstation 306 as the cable 310 travels from the supply spool 302 to the take-up spool 304. Exemplary cable measuring devices 312 are described in U.S. Pat. Nos. 3,523,392 and 4,476,754, both of which are hereby incorporated by reference in their entirety. In one embodiment, the cable measuring device 312 is a measuring machine manufactured by the MGS Group under the model number CAT-150.

A spool drive 314 rotates the spool 304 to cause the cable 310 to be carried from the supply spool 302 across the workstation 306. In one embodiment, the cable measuring device 312 and the spool drive 314 can be controlled by a computer controller, generally designated 316, having a central processing unit 318. The central processing unit 318 can access memory, generally designated 320, such as random access memory 322 and read only memory 324. A peripheral interface 326 can be used to input/download information to the CPU 318. Information output from the CPU 318 can be displayed on a visual display 328. The CPU 318 can run a software-based program that controls the indexing (indexing program) of the spools 302, 304. In one embodiment, a customer specification for a desired distribution cable can be downloaded and accessed by the CPU 318.

The indexing program uses the customer provided information to control indexing of the supply spool 302 and the spool 304. For example, the spool 304 is rotated until a predetermined length of the cable 310 has passed through the cable measuring device 312 and a desired breakout location is positioned at the workstation 306. An operator can then place a marker such as pieces of tape or other markers at the upstream and downstream edges of the desired cut locations on the cable 310. Labels can also be applied to the cable 310. After the cut location has been marked, the operator can actuate the computer controller 316 causing the CPU 318 to index the spools 302, 304 so that the next desired breakout location on the cable 310 is brought into alignment with the workstation 306. The next breakout location is marked as described previously, and the process is repeated until each breakout location has been precisely marked at its corresponding location on the cable 310. Once the full length of the cable 310 has been processed, the cable 310 is cut to length.

To efficiently attach the tethers 244 to the cable 310, it is desired to utilize an assembly line type manufacturing process in which manufacturing steps are serially conducted at consecutive manufacturing stations. To move the cable 310 from station to station, a cart 400 in accordance with the principles of the present disclosure can be used.

Figure 5:
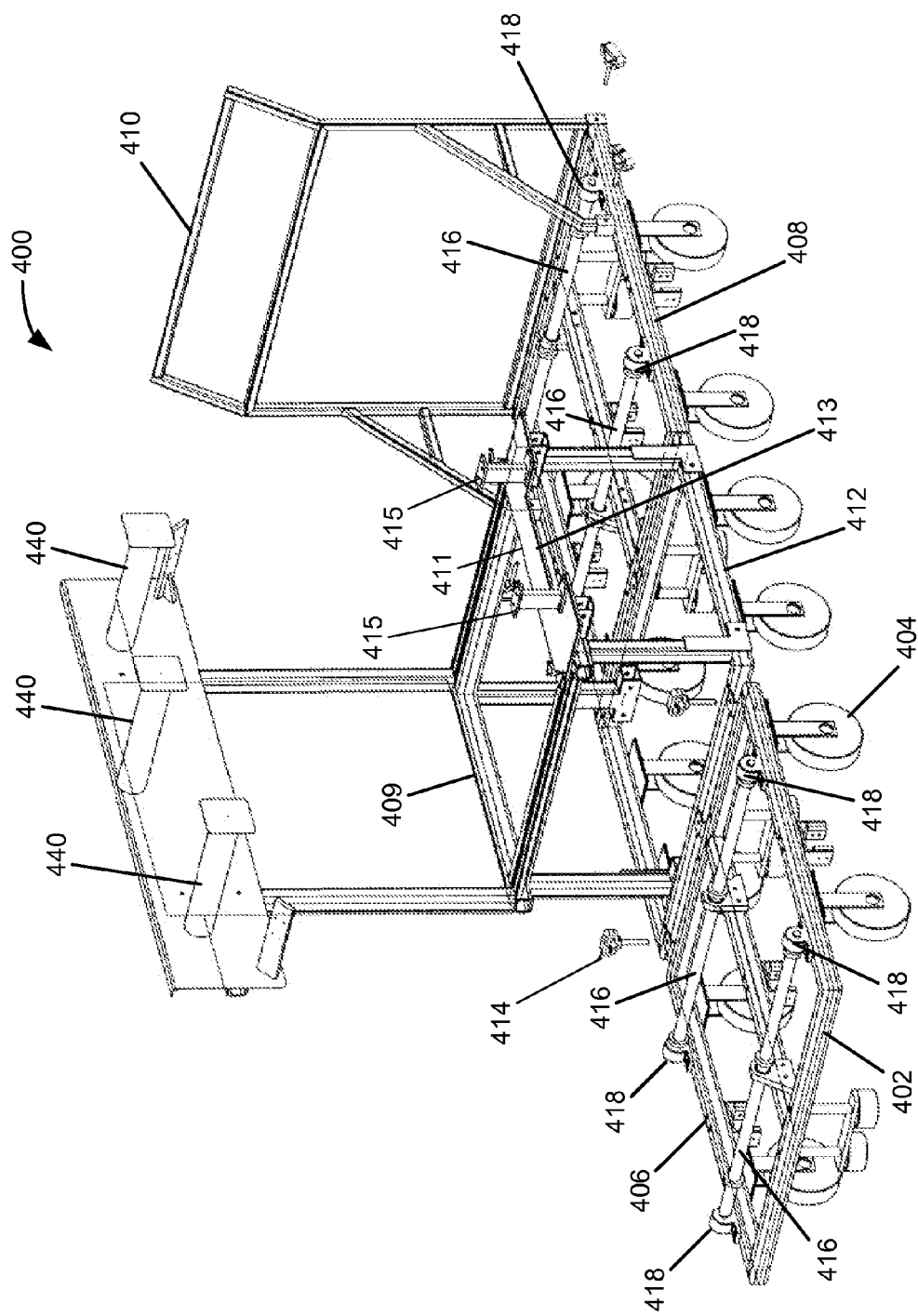
FIG. 5 is a perspective view of a cart having features that are examples of aspects in accordance with the principles of the present disclosure.

Referring now to FIG. 5, the cart 400 includes a frame 402 supported on a plurality of wheels 404 that allows the cart 400 to be readily moved on the manufacturing floor. The frame 402 includes a first spool support 406 and a second spool support 408. A handle 410 is positioned at one end of the frame 402 for pushing the cart 400. In the subject embodiment, and by way of example only, the handle 410 is connectedly engaged with the second spool support 408.

The frame 402 includes a central workstation 412 that is connectedly engaged with the first spool support 406 and the second spool support 408 such that the central workstation 412 is disposed between the first and second spool supports 406, 408. In the subject embodiment, the central workstation 412 is selectively releasably engaged with the first and second spool supports 406, 408 through a plurality of pins 414. In the subject embodiment, the central workstation 412 includes an elevated framework 409. A working platform 411 is connectedly attached to the elevated framework 409 such that the working platform 411 projects outwardly from the elevated framework 409. In the subject embodiment, the working platform 411 includes an opening 413. Clamp mounts 415 are disposed on opposite ends of the opening 413.

In the subject embodiment, the first and second spool supports 406, 408 are structurally similar. Each of the first and second spool supports 406, 408 includes a pair of spool engaging rods 416. The spool engaging rods 416 extend across the width of the frame 402 and have ends positioned within bearings 418 such that the spool engaging rods 416 are free to rotate about their central longitudinal axes.

Figure 6:
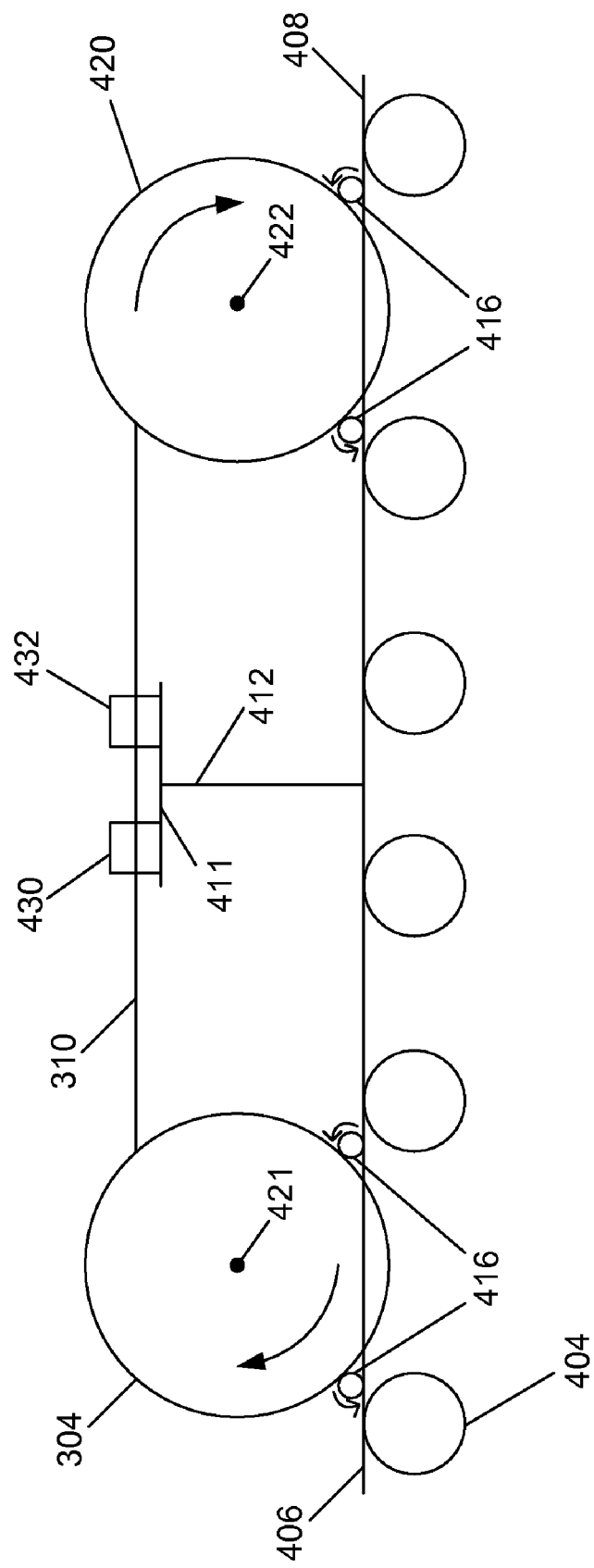
FIG. 6 is a schematic representation of a cart assembly having features that are examples of aspects in accordance with the principles of the present disclosure.

Referring now to FIG. 6, the spool 304 having the distribution cable with the pre-marked breakout locations is positioned between the rods 416 of the first spool support 406. Also, a take-up spool 420 is positioned between the rods 416 of the second spool support 408. The rods 416 allow the spools 304 and 420 to be manually rotated about their central axes 421 and 422 to allow the pre-marked cable 310 to be indexed across the working platform 411 of the central workstation 412.

Once the spools 304, 420 have been loaded on the cart 400, the cable 310 is indexed across the central workstation 412 by manually rotating the spools 304, 420 in a clockwise direction until the first marked breakout location is in alignment with the central workstation 412. Once the first marked breakout location is in alignment with the central workstation 412, clamps 430, 432 provided at the central workstation 412 can be clamped on the cable 310 at opposite sides of the breakout location thereby locking the cable 310 in place. The cart 400 is then moved sequentially through each of the manufacturing stations until the tether 244 has been secured to the main cable and the breakout location has been sealed. Once the breakout location has been completed, the cart 400 is returned to the beginning of the assembly line and the cable 310 is indexed until the next breakout location is positioned at the central workstation 412 and the completed breakout location is stored on the spool 420. Thereafter, the manufacturing process is repeated. The sequence of events is repeated until all tethers have been secured at all of the breakout locations.

Referring again to FIG. 5, the central workstation 412 also includes structure to enhance cable management and to ensure that minimum bend radius requirements corresponding to the cable are maintained. For example, cable management rods 440 are provided above the central workstation 412 to assist in routing the cable 310 while maintaining bend radius requirements.

Figure 7:
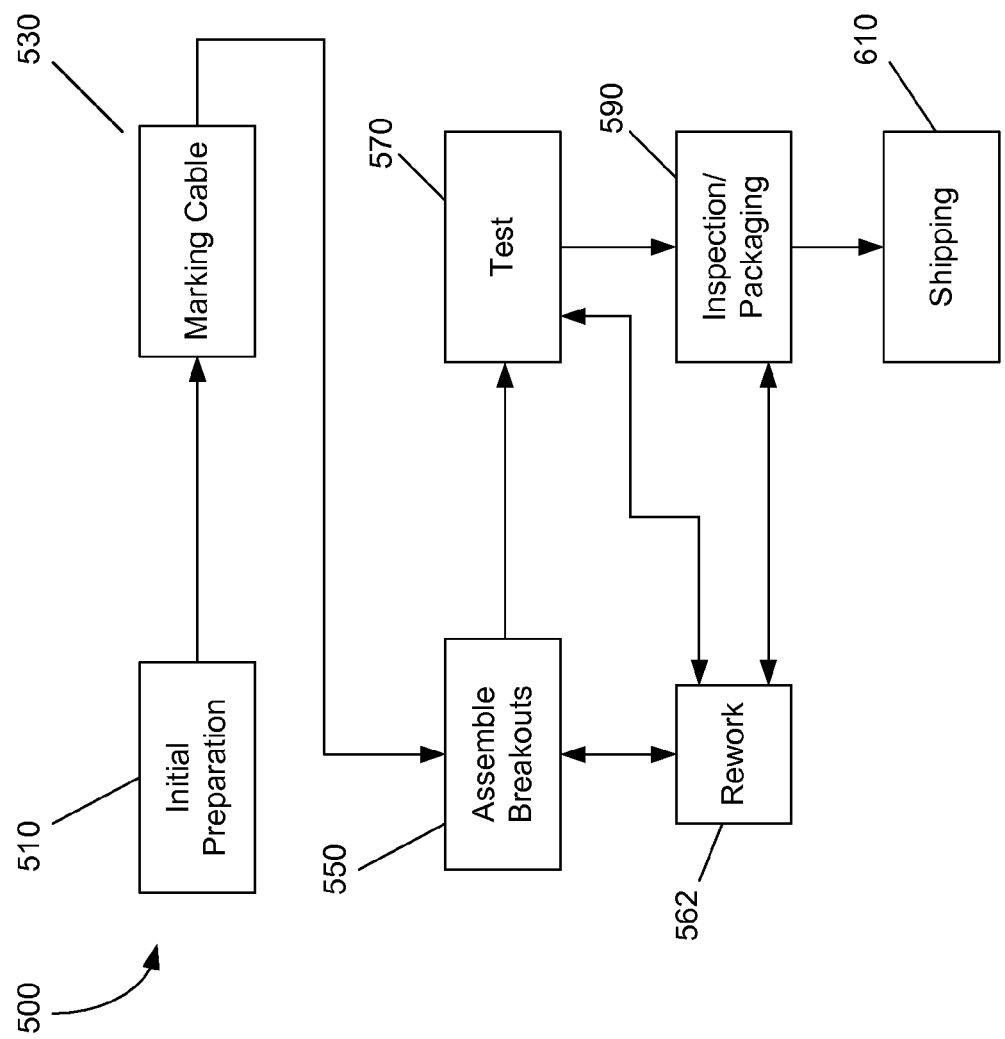
FIG. 7 is an exemplary method for manufacturing a main cable having multiple mid-span breakouts.
Figure 8:
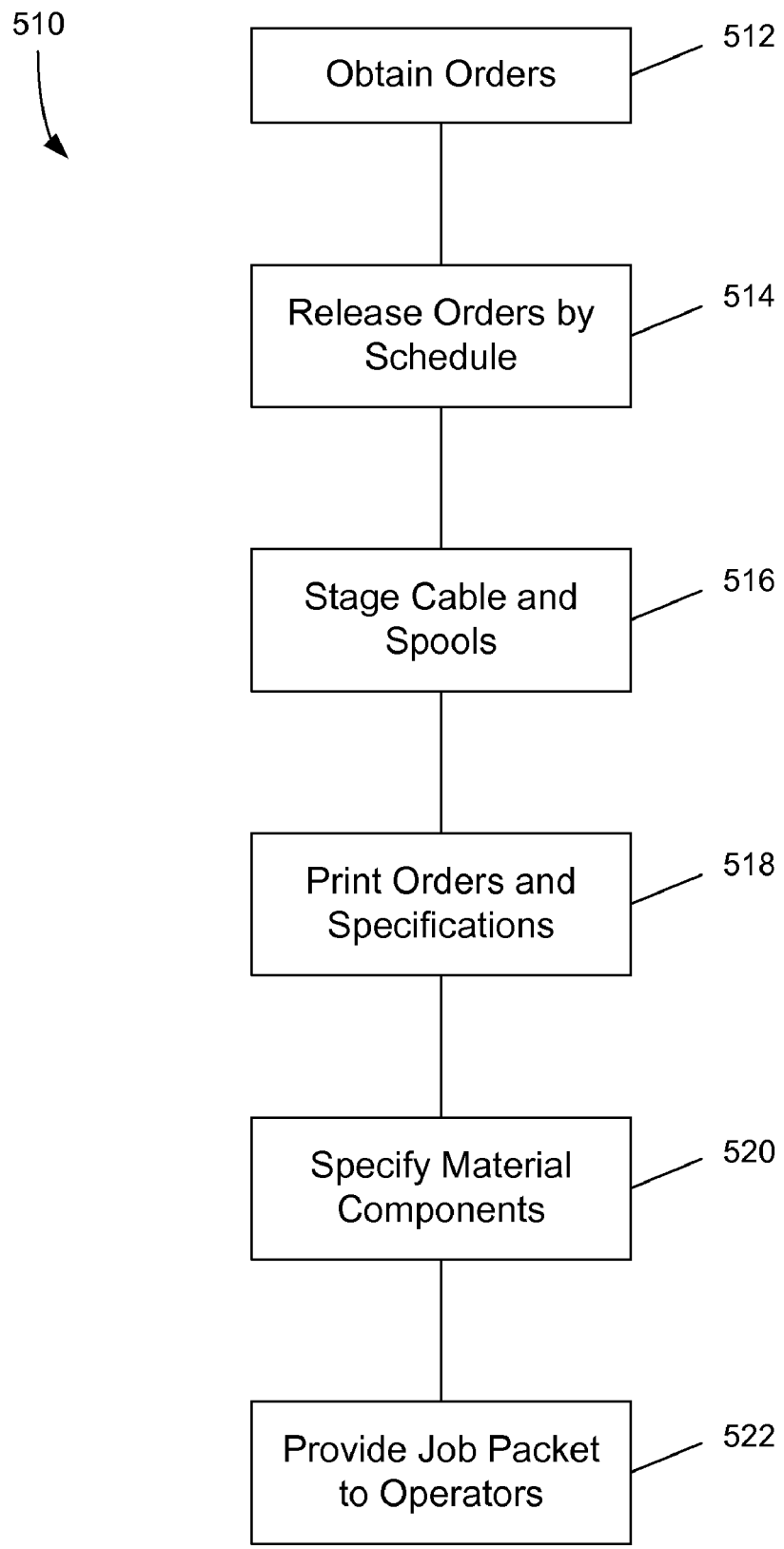
FIG. 8 is an exemplary method for an initial preparation step provided in the method of FIG. 7.

Referring now to FIG. 7, a method 500 for adding breakouts 246 to the cable 310 will be described. In step 510, initial preparations are performed for adding the breakouts 246 to the cable 310 based on a customer order. An exemplary embodiment of the step 510 is shown in FIG. 8. In the embodiment shown in FIG. 8, the initial preparation step 510 includes a step 512 related to obtaining customer orders. The customer orders can be obtained from various sources including a computer database, which is accessible through a database application such as SAP. After the customer orders are obtained, the orders are released to assembly in accordance with a schedule in step 514. The cable 310 and the corresponding spools 302, 304 to be used to fulfill the customer order are staged in step 516. In step 518, the customer orders and specifications related to those orders are printed. Any additional material components that are needed to fulfill the customer order are specified in step 520. A job packet containing the information and materials related to the customer order is provided to assembly operators for assembly of the customer order in step 522.

Figure 9:
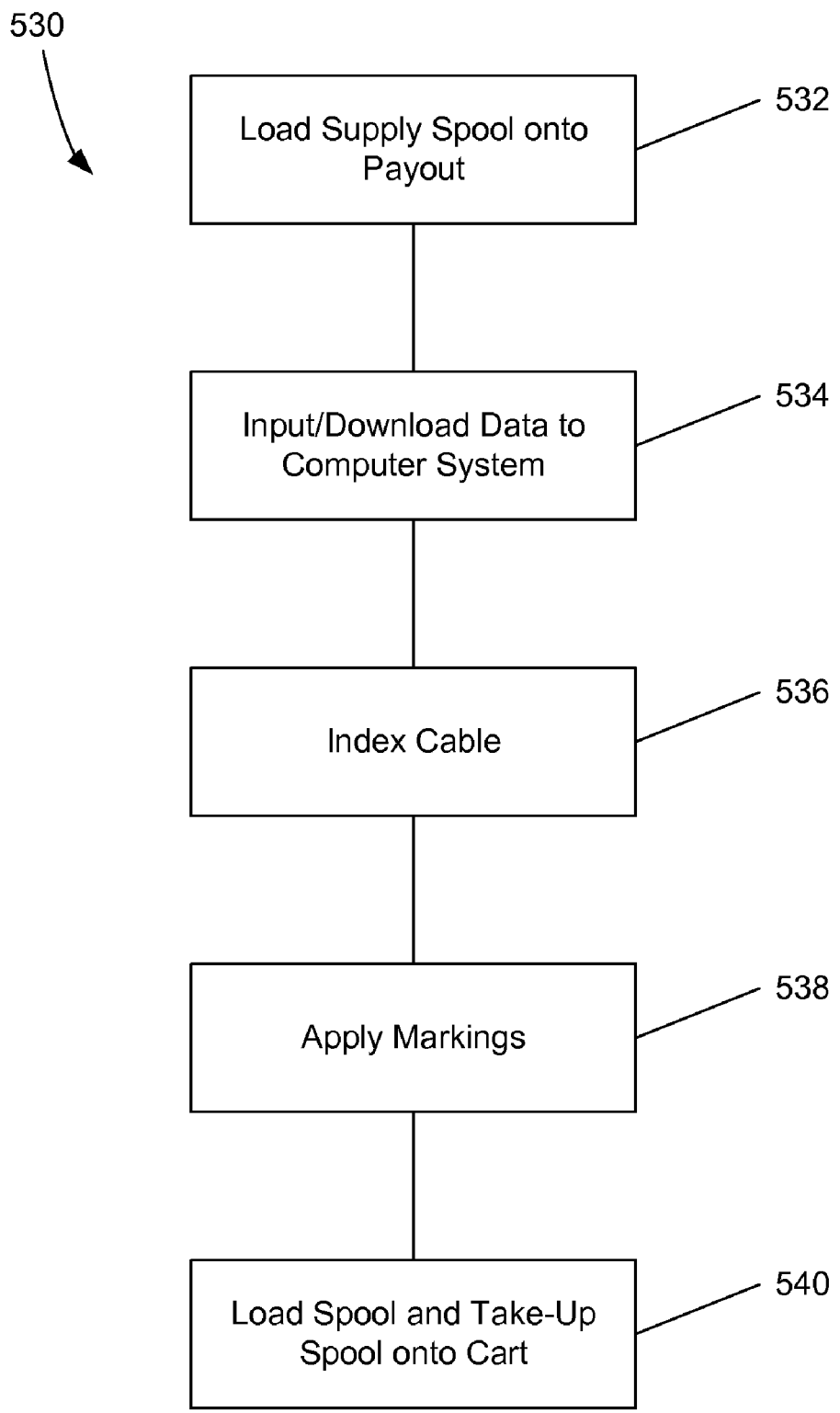
FIG. 9 is an exemplary method for a marking step provided in the method of FIG. 7.

In step 530, the cable 310 is measured, marked, cut and spooled in accordance with the customer order. An exemplary embodiment of the step 530 is shown in FIG. 9. In step 532, the supply spool 302 is loaded onto a cable payout that passes cable 310 through the cable measuring device 312 and onto the spool 304. Data regarding the customer requirements concerning length and breakout locations is inputted/downloaded into the computer controller 316 in step 534. With the customer requirement data inputted/downloaded into the computer controller 316, an operator indexes the supply spool to a desired location (i.e., a breakout location) in step 536. Once the desired location is reached, the operator marks the location in step 538. Steps 536 and 538 are repeated for the entire length of cable 310 required by the customer, at which time the cable 310 is cut. In step 540, the spool 304 and the take-up spool 420 are loaded onto the cart 400.

In step 550, the cart 400 is moved to a breakout assembly line where the breakouts 246 are installed at each breakout location marked on the cable 310. In one embodiment, the cart 400 is moved along a track to each assembly location along the breakout assembly line. After the breakout 246 has been installed at one of the breakout locations along the cable 310, the cart 400 is moved back to the beginning of the assembly line for installation of the breakout 246 at the next breakout location.

Figure 10:
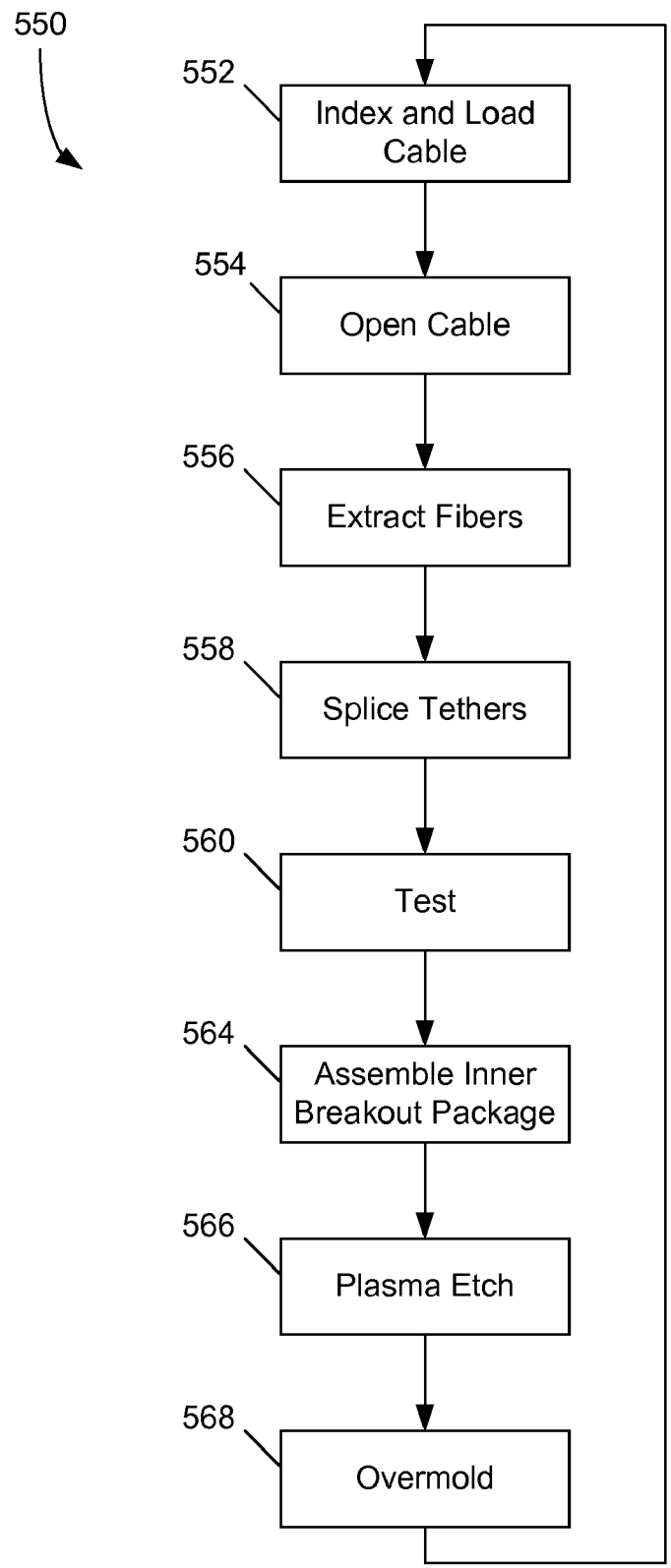
FIG. 10 is an exemplary method for assembling the breakouts of FIG. 2.

Referring now to FIG. 10, an exemplary embodiment of the breakout assembly line will be described. In step 552, the cart 400 is placed on a track that will take the cart through each of the breakout assembly locations along the breakout assembly line. A cap is shrunk fit to an end of the cable 310 to seal the cable 310 during the assembly process. The cable 310 is then indexed to one of the breakout locations marked on the cable 310. The breakout location is loaded over the central workstation 408 and into the clamps 430, 432, which secure the breakout location of the cable 310 to the central workstation 408. At this point, the cart 400 is transferred to the next location along the breakout assembly line.

In step 554 of the breakout assembly line, the breakout location of the cable 310 is opened to provide access to the optical fibers disposed inside the cable 310. In one embodiment, ring cuts are made through a portion of an outer jacket of the cable 310 at the marked locations on the cable 310. The outer jacket of the cable 310 is then slit between the ring cuts so that the outer jacket of the cable 310 disposed between the marked breakout locations can be removed. With the outer jacket of the cable 310 removed between the breakout locations, a stripped region is exposed. First and second windows are then cut through a buffer tube of the cable 310 at upstream and downstream ends, respectively, of the stripped region. At this point, the cart 400 is transferred to the next location along the breakout assembly line.

In step 556, the optical fibers of the cable 310 are extracted through the window of the buffer tube of the cable 310. The optical fibers desired to be broken out are then accessed and severed at the second window. After the optical fibers have been severed, the optical fibers are pulled from the buffer tube through the first window. At this point, the cart 400 is transferred to the next location along the breakout assembly line.

In step 558, the tethers 244 are spliced to the optical fibers at the breakout location. To connect the tethers 244 to the cable 310 at the breakout location, a protective sleeve is slid over the exterior of the tethers 244. Splice sleeves can also be slid over the optical fibers $224_t$ of each of the tethers 244. A polymeric binder or resin is then applied to the ends of the exposed optical fibers 224dc, 224t to encase and ribbonize the ends of the exposed optical fibers 224dc, 224t. The ribbonized ends of the optical fibers 224dc, 224t are then fusion spliced together. After the fusion splice has been completed, the splice sleeves are slid over the fusion splices to protect the splice locations. At this point, the cart 400 is transferred to the next location along the breakout assembly line.

Further description of steps 554, 556 and 558 is provided in U.S. patent application Ser. No. 11/787,218, titled "Fiber optic cable breakout configuration with tensile reinforcement", filed on Apr. 12, 2007 and hereby incorporated by reference in its entirety.

In step 560, the tethers 244 are tested for insertion losses. The multi-fiber connectors 243 of the tethers 244 and connectors disposed on an end of a test cord are each cleaned and connected such that each multi-fiber connector 243 of the tethers 244 is connected to one of the connectors on the test cord. In one embodiment, the insertion losses are tested at 1310 nm and at 1550 nm. Measurements are then uploaded to the database through the database application and continuity and lengths are verified. If the measurements fail to meet certain criteria, the cart 400 is moved off of the breakout assembly line to a rework location for a rework/inspection step 562 (shown in FIG. 7). After the rework/inspection step 562, the cart 400 can be moved back into the breakout assembly line provided the rework was successful. If, however, the measurements meet the criteria, then the cart 400 is transferred to the next location along the breakout assembly line.

In step 564, an inner breakout package is assembled. In one embodiment, the breakout block 254 and the retention block 258 are secured in place by an adhesive, such as epoxy. The tube 250 is then engaged to the breakout and retention blocks 254, 258 such that the tube 250 extends between the breakout and retention blocks 254, 258. In one embodiment, the silicone tape is wrapped around the breakout and retention blocks 254, 258, the tube 250, and the cable 310 at the breakout location. Additional adhesive may be applied to seal the inner package. At this point, the cart 400 moves to the next location along the breakout assembly line.

With the inner breakout package assembled, an etching operation is performed in step 566 following a cleaning operation. The etching operation increases the surface area of adhesion regions, which are disposed on the outer jacket of the cable 310 adjacent to the stripped region, by providing disruptions on the adhesion regions of the outer jacket of the cable 310. An exemplary etching operation has been described in U.S. patent application Ser. No. 11/702,914, titled "Polyurethane to polyethylene adhesion process", filed on Feb. 6, 2007 and is hereby incorporated by reference in its entirety. After the etching operation step 566, the cart 400 moves to the next location along the breakout assembly line.

In step 568, an overmold is applied to the breakout 246. An exemplary overmold process has been described in U.S. patent application titled "Multi-stage low pressure injection over-molding system with intermediate support and method of use," having Ser. No. 60/980,384,, filed concurrently herewith, and hereby incorporated by reference in its entirety. With the overmold application step 568 complete, the assembly of the breakout 246 is complete. At this point, the cart 400 moves back to step 552 in the breakout assembly line so that the cable 310 can be indexed to the next breakout location for assembly of the next breakout 246. This assembly process repeats until the breakouts 246 have been assembled at each breakout location.

Referring again to FIG. 7, with the breakouts 246 assembled at each breakout location, the cart 400 is transferred to a location at which a testing operation 570 is performed. In one embodiment, only select optical fibers are tested. The results of the testing operation 570 are recorded at the location and compared to a set of testing requirements. If any of the select optical fibers do not meet the testing requirements, the cart 400 is transferred to the rework location for the rework/inspection step 562. If, however, the optical fibers meet all of the testing requirements, the cart 400 is transferred to a location at which a quality inspection/packaging operation 590 is performed on the cable 310.

The cable 310 and each of the breakouts 246 are inspected for quality at step 590. If the cable 310 or any of the breakouts 246 fail the quality inspection, the cart 400 is transferred to the rework location for the rework/inspection operation 562. If the cable 310 and the breakouts 246 meet quality standards, the take-up spool 420, around which is coiled the cable 310 and the breakouts 246, is removed from the cart 400 and packaged for shipping. In one embodiment, the take-up spool 420 is placed on a pallet and wrapped in a corrugated plastic wrap. The test results are then attached along with customer labels. The package is then shrink wrapped and sent to a shipping and receiving location, where the product is shipped in step 610.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cart assembly for use in adding a breakout to a fiber optic cable comprising:
a frame having a first spool support, a second spool support and a central workstation, the first spool support including a first plurality of spool engaging rods that extends across a width of the frame, the second spool support including a second plurality of spool engaging rods that extends across the width of the frame, each of the spool engaging rods including ends positioned within bearings, the central workstation is engaged with the first spool support and the second spool support such that the central workstation is disposed between the first spool support and the second spool support, wherein the central workstation is selectively releasably engaged with the first and second spool supports; and
a cable spool positioned between the first plurality of spool engaging rods.

2. A cart assembly for use in adding a breakout to a fiber optic cable as claimed in claim 1, wherein a take-up spool is positioned between the second plurality of spool engaging rods.

3. A cart assembly for use in adding a breakout to a fiber optic cable as claimed in claim 1, wherein the frame is supported on a plurality of wheels.

4. A cart assembly for use in adding a breakout to a fiber optic cable as claimed in claim 1, wherein a plurality of pins engages the central workstation to the first and second spool supports.

5. A cart assembly for use in adding a breakout to a fiber optic cable as claimed in claim 1, wherein the central workstation includes an elevated framework including a working platform that projects outwardly from the elevated framework.

6. A cart assembly for use in adding a breakout to a fiber optic cable as claimed in claim 5, wherein clamp mounts are disposed on opposite ends of the working platform.

7. A cart assembly for use in adding a breakout to a fiber optic cable as claimed in claim 5, wherein the central workstation includes a plurality of cable management rods disposed above the working platform.

8. A cart assembly comprising:
   a frame;
   a first spool support including a first plurality of spool engaging rods rotatably engaged to the frame, each spool engaging rod defining a central longitudinal axis and being adapted to rotate about its central longitudinal axis;
   a second spool support including a second plurality of spool engaging rods rotatably engaged to the frame, each spool engaging rod defining a central longitudinal axis and being adapted to rotate about its central longitudinal axis;
   a central workstation disposed between the first and second spool supports, wherein the central workstation is selectively releasably engaged with the first and second spool supports;
   and a cable spool having an outer diameter supported on the first plurality of spool engaging rods of the first spool support, wherein each spool engaging rod of the first plurality of spool engaging rods rotates about its central longitudinal axis as the cable spool rotates about its central axis.

9. The cart assembly of claim 8, wherein the frame is supported on a plurality of wheels.

10. The cart assembly of claim 8, further comprising a take-up spool having an outer diameter supported on the second plurality of spool engaging rods of the second spool support, wherein each spool engaging rod of the second plurality of spool engaging rods rotates about its central longitudinal axis as the cable spool rotates about its central axis.

11. The cart assembly of claim 8, wherein the central workstation includes an elevated framework including a working platform that projects outwardly from the elevated framework.

12. The cart assembly of claim 11, wherein the central workstation includes a plurality of cable management rods disposed above the working platform.

13. The cart assembly of claim 11, wherein clamp mounts are disposed on opposite ends of the working platform.

* * * * *